United States Patent [19]
Albertson

[11] Patent Number: 5,505,120
[45] Date of Patent: Apr. 9, 1996

[54] WATER FILTER

[76] Inventor: David V. Albertson, 3124 Brooks La., Wayzata, Minn. 55391

[21] Appl. No.: 353,666

[22] Filed: Dec. 12, 1994

[51] Int. Cl.$^6$ .............................. B01D 27/02; A47J 31/06
[52] U.S. Cl. ............................... 99/286; 99/290; 99/295; 99/300; 210/282; 210/283
[58] Field of Search .......................... 99/279, 286, 290, 99/295, 298, 300, 304, 306, 316; 210/266, 282, 283; 426/433

[56] References Cited

U.S. PATENT DOCUMENTS

| | | |
|---|---|---|
| 1,479,758 | 1/1924 | Tucker . |
| 2,630,227 | 3/1953 | Rodwell . |
| 4,461,706 | 7/1984 | Siegers ..................................... 210/283 |
| 4,476,023 | 10/1984 | Horikoshi ............................... 210/282 |
| 4,764,274 | 8/1988 | Miller . |
| 4,969,996 | 11/1990 | Hankammer . |
| 4,995,310 | 2/1991 | van der Lijn et al. . |
| 5,049,272 | 9/1991 | Nieweg . |
| 5,277,318 | 1/1994 | Smalley, Jr. et al. . |
| 5,318,703 | 6/1994 | Heiligman . |
| 5,370,041 | 12/1994 | Lowe ....................................... 99/286 |
| 5,427,683 | 6/1995 | Gershon ................................. 210/283 |

FOREIGN PATENT DOCUMENTS 3936611  5/1991  Germany .

OTHER PUBLICATIONS

"Water Filters," Consumer Reports, Feb. 1983, pp. 68–73, 102.
Newsweek, LA Times, ABC Nat'l, and Consumer Rep. excerpts, 1983.
"Consumer's Guide to Safe Drinking Water," Consumer Report No. 11.
"The Water We Drink, An Information Guide." (No Date).
Water consumption article, Star Tribune, Dec. 17, 1987.
Water contamination article, Associated Press.
"Nadar raps EPA's effort to clean water," Miami Herald, Jan. 6, 1988.
"Is Your Water Safe To Drink?" Redbook, Jul. 1988, pp. 90–91, 128.
"Drinking Water, A Community Action," Concern, Inc. Brita publication, 1994.

*Primary Examiner*—Robert W. Jenkins

[57] ABSTRACT

A water purification device used in connection with the brewing of coffee in an automatic drip coffee maker has an annular sleeve contained within the moveable basket of the coffee maker. The water purification device has an activated charcoal resin operable to filter and purify hot water flowing from the coffee maker through the annular sleeve. The lower end of the sleeve has a plurality of circumferentially spaced openings to allow lateral movement of the water and steam away from the annular sleeve.

23 Claims, 3 Drawing Sheets

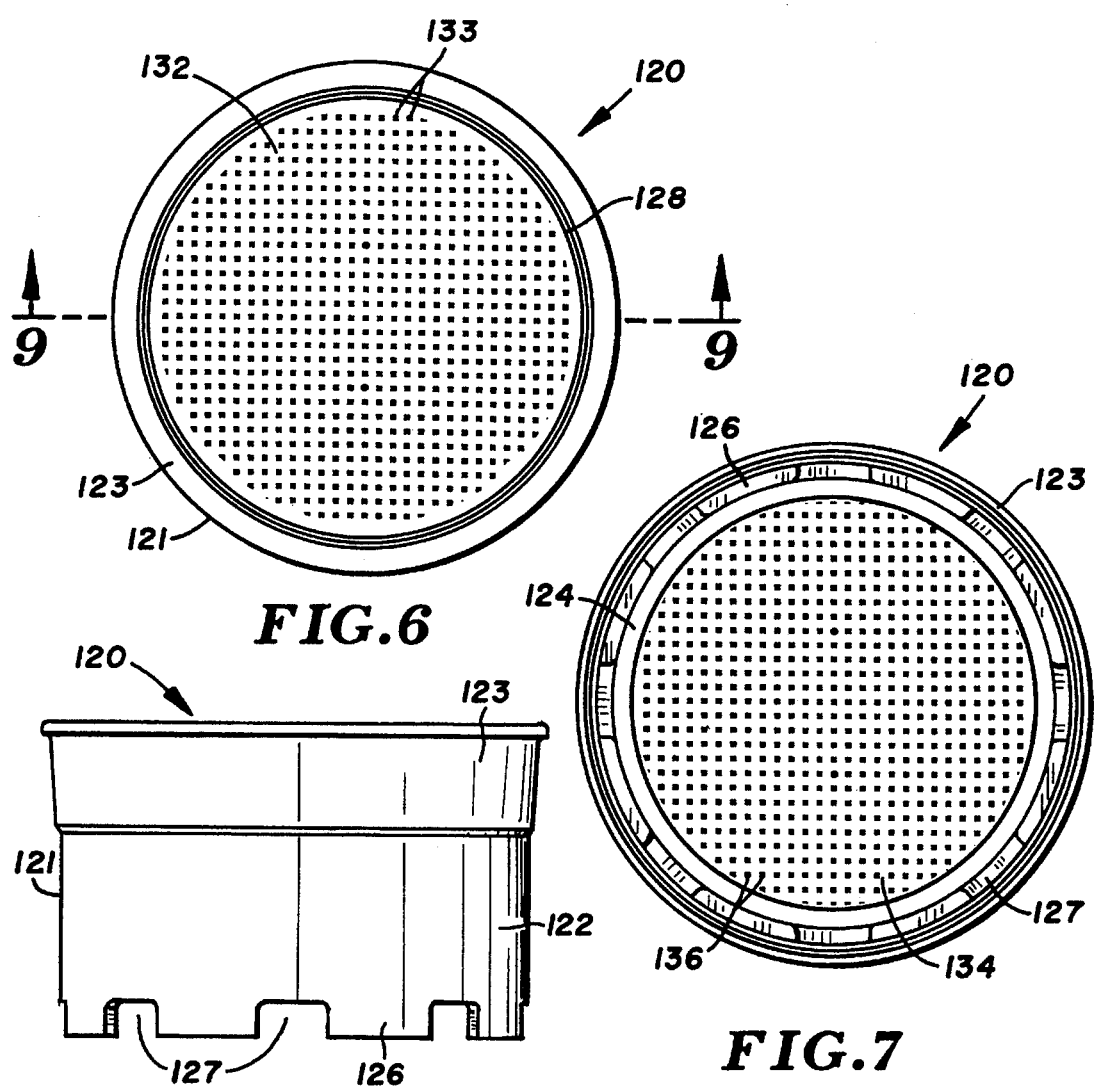
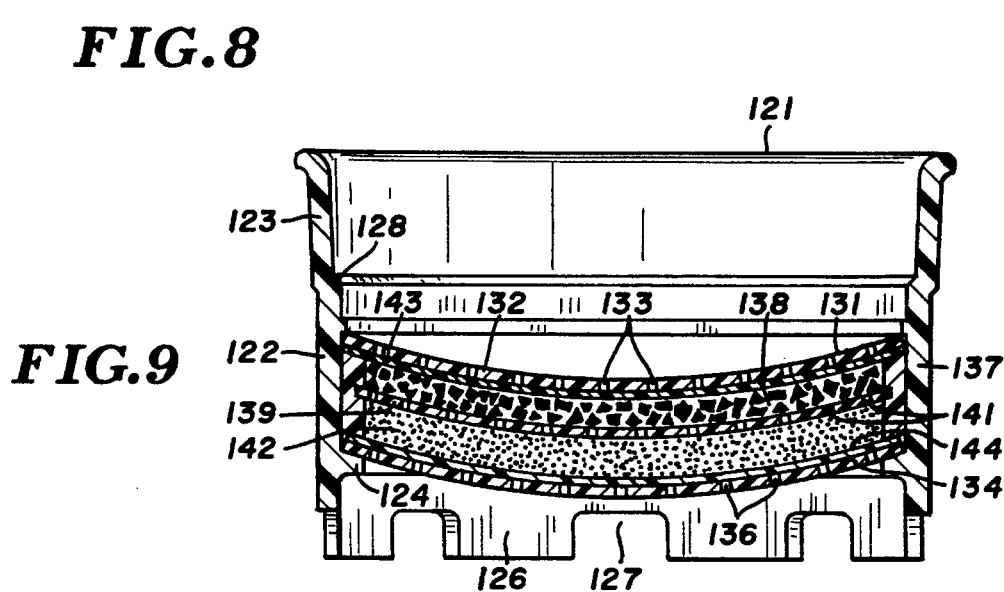

5,505,120

WATER FILTER

FIELD OF THE INVENTION

The invention relates to fluid treatment systems and fluid filters, particularly disposable fluid filters adapted for use in removing contaminants and the like from fluids prior to consumption.

BACKGROUND OF THE INVENTION

In the past, various devices have been used to filter liquids prior to consumption. Liquor and wine contain fusel oils, contaminants and polymers that cause headaches. Water supplies often contain contaminants which results in water having offensive tastes and odors. Brewing coffee in coffee makers using such contaminated water commonly produces coffee having a disagreeable flavor and generally distasteful.

Water purification devices are known. Water to be purified flows through a filter having a purification agent, such as an ion exchanger, activated carbon or the like, and is collected in purified forms in a collecting container. It is common place that these filters may become partially blocked considerably slowing down and disturbing water flow.

SUMMARY OF THE INVENTION

The invention is directed to a liquid filter for filtering liquid prior to consumption. The filter functions to remove contaminants, offensive tastes and odors from the liquid to provide a better, smoother tasting liquid.

The filter has a generally annular sleeve having a passage with an open top and an open bottom. A shoulder projects inwardly from the inner surface of the sleeve in engagement with a resin member located in the passage of the sleeve with a tight fit relation. The resin member has a top cover located in the passage of the sleeve and a second bottom cover located in the passage spaced from the first cover. The resin member includes a resin medium of filter grade granulated activated charcoal particles operable to filter and purify liquid flowing through the sleeve thereby removing contaminants, offensive tastes and odors from the liquid before consumption. A sheet member encloses the resin medium within the passage of the sleeve between the first and second covers. The first and second covers each have a generally convex shape with a plurality of openings to allow passage of liquid through the resin member.

A modification of the filter has a resin member located in the passage of an annular sleeve with a tight fit relation. The resin member has a top cover located in the passage of the sleeve, a second bottom cover located in the passage spaced from the first cover, and a third middle plate located between the top and bottom covers. The resin member includes a first layer of resin medium horizontally separated from a second layer of resin medium with the middle plate. The first layer of resin medium contains large filter grade activated charcoal particles whereas the second layer of resin medium contains small filter grade activated charcoal particles. The first layer of resin medium removes larger sized contaminants and the like to avoid partial blockage of the resin member. A sheet member encloses the first and second layers of the resin medium within the passage of the sleeve between the first and second covers.

The filter is adapted for use with conventional coffee makers. The lower end of the annular sleeve has a plurality of upwardly directed slots therein. The slots are circumferentially spaced on the lower end of the sleeve. This enables hot water and steam moving out of the lower end of the sleeve to move laterally along the surface of the coffee grounds located in the coffee maker basket. The sleeve has a height and circumference that are less than the height and circumference of the basket of the coffee maker so as to not interfere with the pivotal movements of the basket. The resin medium contains high temperature resistant activated charcoal to filter and purify heated water flowing from the coffee maker.

DESCRIPTION OF THE DRAWING

FIG. 6 is a top plan view of a modification of the water filter;

FIG. 7 is a bottom plan view thereof;

FIG. 8 is a front elevational view thereof; and

FIG. 9 is an enlarged sectional view taken along the line 9—9 of FIG. 6.

DESCRIPTION OF THE PREFERRED EMBODIMENTS

Figure 1:
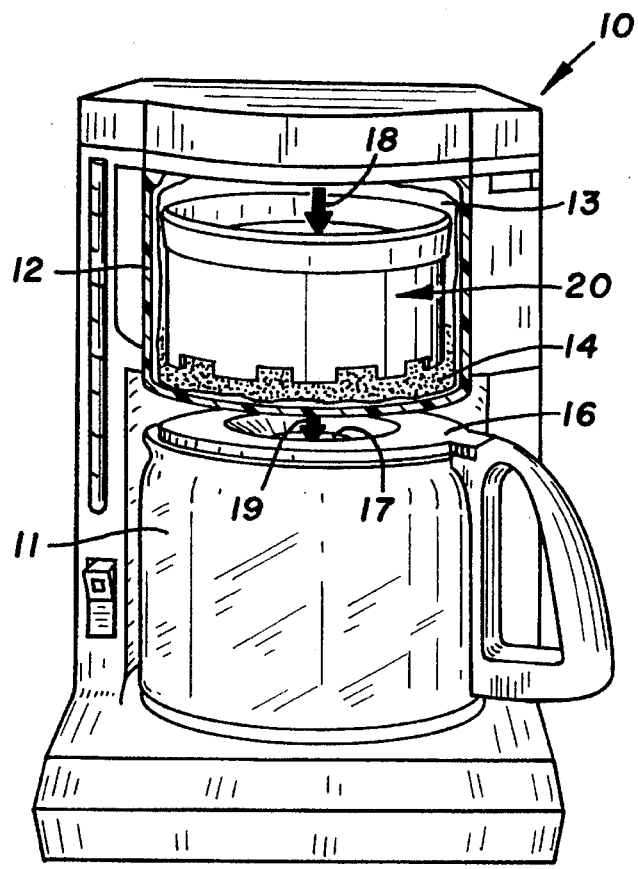
FIG. 1 is a coffee maker equipped with the water filter of the invention.
Figure 2:
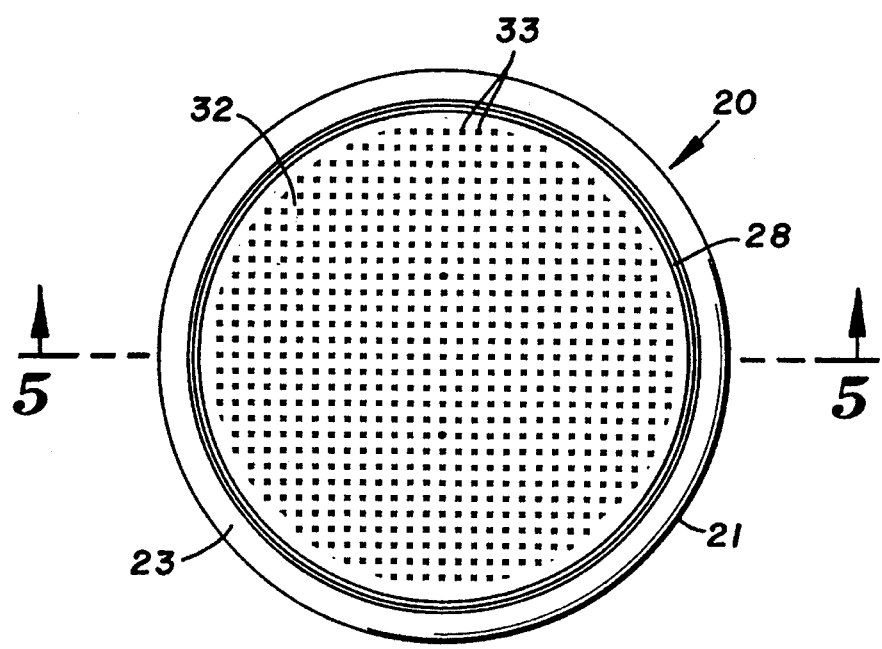
FIG. 2 is a top plan view of the water filter of FIG. 1.
Figure 3:
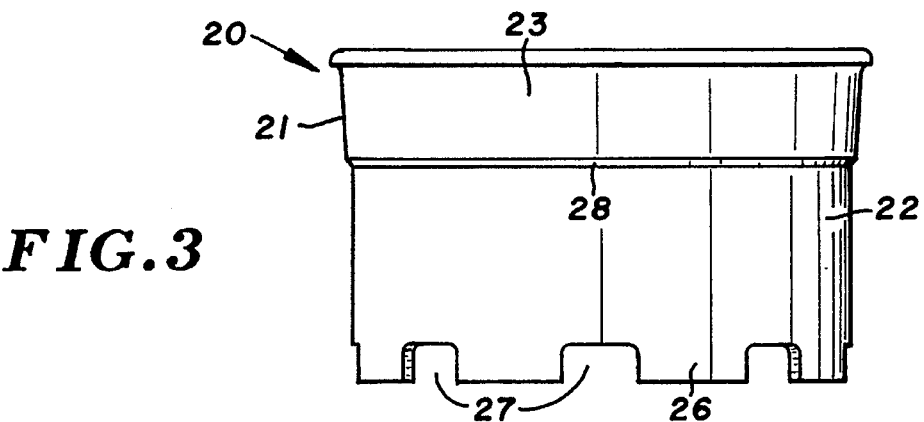
FIG. 3 is a front elevational view thereof.
Figure 4:
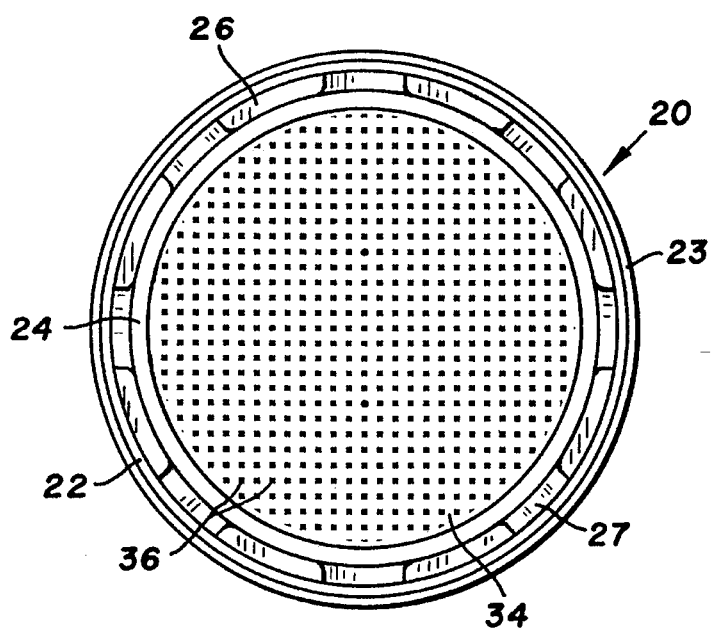
FIG. 4 is bottom plan view thereof.

Referring to FIG. 1, there is shown a coffee maker indicated generally at 10 used for brewing coffee. Coffee maker 10 has a coffee pot 11 for accommodating coffee. A receptacle or basket 12 is pivotally mounted on coffee maker 10 above pot 11. Basket 12 holds a filter paper 13 containing coffee grounds 14. A filter of the invention, indicated generally at 20, is shown located on top of coffee grounds 14 contained within filter paper 13. Filter 20 is used to filter heated water prior to brewing of coffee. Hot water flows out of coffee maker 10 through filter 20 before passing through coffee grounds 14. Filter 20 removes contaminants present in the water thereby purifying the water. Filter 20 also functions to minimize bacterial growth known to be found in local tap drinking water supplies. Moreover, beneficial minerals, such as sodium and magnesium as well as the pH value of the water, are largely unaffected by filter 20. Filter 20 can also be used to remove contaminants and residuals from other consumed liquids, such as alcoholic beverages.

Referring to FIGS. 2 to 5, filter 20 has a generally annular outer shell or sleeve 21. Sleeve 21 has a top portion 23 that diverges outwardly from the middle of sleeve 21 to an outwardly turned top edge. A generally circular or ring-like side wall 22 extends below top portion 23. The top of side wall 22 is connected to top portion 23 of sleeve 21 with an outwardly inclined rib 28. The bottom end 26 of side wall 22 has a plurality of notches or slots 27. Filtered water flows through slots 27 to surrounding coffee grounds 14.

Figure 5:
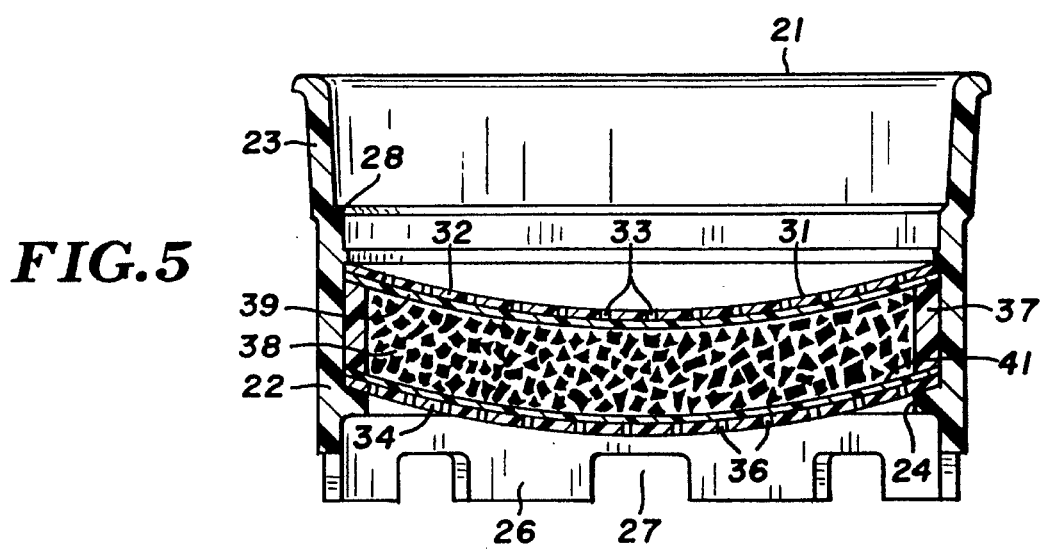
FIG. 5 is an enlarged sectional view taken along the line 5—5 of FIG. 2.

The inside surface of sleeve 21 has an inwardly directed annular shoulder 24 located above bottom end 26 of the sleeve. Shoulder 24 supports a filter disc 31 thereby preventing filter disc 31 from passing through sleeve 21. As seen in FIG. 5, filter disc 31 has a top cover 32 and a bottom cover 34. Top filter cover 32 is a concave curve shaped circular plastic member having a plurality of openings 33. Bottom filter cover 34 is a circular plastic member having a concave curve shape similar to top cover 32. Bottom cover 34 has a plurality of openings 36 to facilitate water flow out of filter 20. An inner ring 37 is located between filter covers 34 and 36. Ring 37 has a tight fit relation with the inside surface of side wall 22. Circular screens or filter sheets 39 and 41 are located below top cover 32 and above bottom cover 34 of filter disc 31. Each filter sheet 39, 41 is a porous plastic or fabric disc that prevents fine particles of activated charcoal from escaping filter bed 38 of charcoal. The outer edges of filter sheet 39 are clamped between top cover 32 and ring 37. The outer edges of filter sheet 41 are clamped between bottom cover 34 and ring 37.

Filtration with filter 20 is based on an ion exchange process without the use of additional chemical activators. A filter bed or resin 38 contained between filter sheets 39 and 41 exchanges contaminants, such as chlorine, organic pollutants and suspended solids, and hard water ions present in the water for hydrogen ions in order to purify the water. Resin 38 is a silver loaded activated ion exchange resin having high-temperature resistant granulated charcoal particles. The charcoal particles of resin 38 have a filter grade that can be subjected to hot water with temperature of approximately 170 degrees. Resin 38 removes chlorine, trihalomethanes, PCB's, odors and offensive tastes commonly found in water. Other types of resins can be incorporated in filter 20.

In operation, basket 12 is moved to an open position and fitted with a filter paper 13. A measured amount of ground coffee 14 is poured into filter paper 13. Filter 20 is placed on top of the coffee grounds 14 in a middle portion of basket 12. Coffee maker 10 is filled with water and basket 12 is pivoted to a closed brewing position by swinging basket 12 into the housing of coffee maker 10. The height of sleeve 21 is less than the distance between the top of coffee grounds 14 and the top edge of basket 12. Also, the circumference of sleeve 21 is less than the circumference of basket 12 whereby filter 20 is contained within the interior of basket 12. This enables basket 12 to be pivoted between a closed brewing position and an open position without interference from filter 20 when filter 20 is located on top of coffee grounds within basket 12. When basket 12 is located in the closed position, filter 20 is aligned with the water exit opening of coffee maker 10 whereby hot water flows downwardly out of the exit opening into filter 20, as indicated by arrow 18 in FIG. 1. When water is introduced into the top of filter 20 it passes through openings 33 in cover 32, through screen 39 and filter bed 38 and leaves through openings 36 in bottom cover 34 in a purified condition and then flows through coffee grounds 14 to be collected in container 11 as coffee having an improved aroma and smooth taste. Slots 27 in the bottom end 26 of sleeve side wall 22 allow the filtered water to flow transversely from filter 20 and cover the entire top surface area of coffee grounds 14. The brewed coffee flows out of the bottom of basket 12 through opening 17 in coffee pot cover 16 into coffee pot 11, as indicated by arrow 19 in FIG. 1.

After the brewing procedure has been completed, basket 12 is moved to the open position so that filter 20 can be removed and rinsed off. Filter paper 13 and coffee grounds 14 are replaced with a new filter paper and fresh coffee grounds. Filter 20 is then replaced on top of the fresh grounds so that another brewing cycle may be commenced. Filter 20 is used to filter water for approximately 100 pots of coffee before being discarded and replaced by another filter. An indicator (not shown) can be incorporated with filter 20 to indicate when the filter should be changed. Filter 20 fits most home and commercial coffee makers. Filter 20 is easily and conveniently removed from coffee maker basket 12 for rinsing or replacement.

Referring to FIGS. 6 to 9, there is shown a modification of the filter of the invention, indicated generally at 120, used to filter heated water flowing from a coffee maker prior to brewing of coffee. Filter 120 has a generally annular outer sleeve 121. Sleeve 121 has an outwardly diverging top portion 123 that terminates in an outwardly turned top edge. A generally circular side wall 122 extends downwardly below top portion 123. The top of side wall 122 is connected to top portion 123 of sleeve 121 with annular rib 128. The bottom end 126 of side wall 122 has a plurality of notches or slots 127 that allow filtered water to flow through slots 127 to coffee grounds that surround side wall 122.

Sleeve 121 has an inwardly directed annular shoulder 124 located on the inside surface thereof above bottom end 126. Shoulder 124 supports a filter disc 131 and prevents filter disc 131 from passing through sleeve 121. As seen in FIG. 9, filter disc 131 has a top cover 132, a bottom cover 134 and a middle partition 139. Top cover 132 is a concave curved circular member having openings 133. Bottom cover 134 is a circular member having a concave curved shape with a plurality of openings 136. Partition 139 has a concave curved shape similar to covers 132 and 134. Openings 141 in partition 139 allow water to pass from upper filter medium 138 to lower filter medium 142. An inner ring 137 joined to filter covers 134 and 136 and partition 139 has a tight fit relation with the inside surface of side wall 122. Circular screens or sheets 143 and 144 are located below top cover 132 and above bottom cover 134, respectively. Each filter sheet 143, 144 is a porous plastic or fabric disc that prevents particles of activated charcoal from escaping filter beds 138 and 142. The outer edges of filter sheet 143 are clamped between top cover 132 and ring 137. The outer edges of filter sheet 144 are clamped between bottom cover 134 and ring 137.

As shown in FIG. 9, filter bed 138 is contained between filter sheet 143 and partition 139. Filter medium 142 is located between filter sheet 144 and partition 139. Filter beds 138 and 142 have granular activated carbon that removes contaminants such as chlorine, odors and offensive tastes present in the water. Upper filter medium 138 contains large-sized or coarse activated charcoal particles. Lower filter medium 142 contains small-sized or fine activated charcoal particles. Water flows through upper filter medium 138 first to remove a substantial portion of the contaminants present in the water and then through lower filter medium 142. This reduces the potential of blockage and ineffective filtration of filter 120. The granulated charcoal particles of resins 138 and 142 are filter grade particles having a high temperature tolerance. Other types of resins can be incorporated in filter 120.

While there has been shown and described embodiments of the water filter, it is understood that changes in the structure and arrangement of structure, materials and parts may be made by one skilled in the art without departing from the invention. The invention is defined in the following claims.

I claim:

1. A filter for potable liquids comprising: annular sleeve means having a passage with an open top and an open bottom, shoulder means projecting inwardly from an inner surface of the sleeve means, resin means located in the passage of the sleeve means in engagement with the sleeve means and the shoulder means, the resin means having first cover means located in the passage and second cover means located in the passage spaced from the first cover means, the resin means including a resin medium operable to filter and purify liquid flowing through the sleeve means thereby removing offensive tastes and odors from the liquid, and sheet means enclosing the resin medium within the passage of the sleeve between the first and second cover means.

2. The filter of claim 1 wherein: the resin means includes high temperature filter grade granulated activated charcoal particles.

3. The filter of claim 1 wherein: the resin means is a silver loaded activated charcoal ion exchange resin.

4. The filter of claim 1 wherein: the resin medium has a first layer of resin material and a second layer of resin material enclosed within the sheet means, third cover means horizontally separating the first layer from the second layer.

5. The filter of claim 4 wherein: the first layer of resin material contains coarse activated charcoal particles, the second layer of resin material containing fine activated charcoal particles.

6. The filter of claim 1 wherein: the first and second cover means each have a generally convex shape having a plurality of openings to allow passage of liquid through the resin means.

7. The filter of claim 1 wherein: the sleeve means has a lower end having a plurality of upwardly directed slots therein.

8. The filter of claim 7 wherein: the slots are circumferentially spaced on the lower end of the sleeve means.

9. A water filter for a coffee maker comprising: sleeve means having a passage with an open top and an open bottom, shoulder means projecting inwardly from an inner surface of the sleeve means, resin means located in the passage of the sleeve means in engagement with the sleeve means and the shoulder means, the resin means having first cover means located in the passage and second cover means located in the passage spaced from the first cover means, the resin means including a resin medium operable to filter and purify water flowing from a coffee maker through the sleeve means thereby removing offensive tastes and odors from the water, and sheet means enclosing the resin medium within the passage of the sleeve between the first and second cover means.

10. The filter of claim 9 wherein: the resin means includes high temperature filter grade granulated charcoal particles.

11. The filter of claim 9 wherein: the resin means is a silver loaded activated charcoal ion exchange resin.

12. The filter of claim 9 wherein: the resin medium has a first layer of resin material and a second layer of resin material enclosed within the sheet means, third cover means horizontally separating the first layer from the second layer.

13. The filter of claim 12 wherein: the first layer of resin material contains coarse activated charcoal particles, the second layer of resin material containing fine activated charcoal particles.

14. The filter of claim 9 wherein: the first and second cover means each have a generally convex shape having a plurality of openings to allow passage of water through the resin means.

15. The filter of claim 9 wherein: the sleeve means has a lower end having a plurality of upwardly directed slots therein.

16. The filter of claim 15 wherein: the slots are circumferentially spaced on the lower end of the sleeve means.

17. An apparatus for brewing coffee comprising: a coffee maker having a pivotally mounted basket for accommodating coffee grounds, filter means located in the basket, the filter means having annular sleeve means having a passage with an open top and an open bottom, the sleeve means having a lower end with a plurality of upwardly directed slots therein, shoulder means projecting inwardly from an inner surface of the sleeve means, resin means located in the passage of the sleeve means in engagement with the sleeve means and the shoulder means, the resin means having first cover means located in the passage and second cover means located in the passage spaced from the first cover means, the resin means including a resin medium operable to filter and purify water flowing from the coffee maker through the sleeve means thereby removing offensive tastes and odors from the water, and sheet means enclosing the resin medium within the passage of the sleeve between the first and second cover means.

18. The filter of claim 17 wherein: the resin means includes high temperature filter grade granulated charcoal particles.

19. The filter of claim 17 wherein: the resin means is a silver loaded activated charcoal ion exchange resin.

20. The filter of claim 17 wherein: the resin medium has a first layer of resin material and a second layer of resin material enclosed within the sheet means, third cover means horizontally separating the first layer from the second layer.

21. The filter of claim 20 wherein: the first layer of resin material contains coarse activated charcoal particles, the second layer of resin material containing fine activated charcoal particles.

22. The filter of claim 17 wherein: the first and second cover means each have a generally convex shape having a plurality of openings to allow passage of water through the resin means.

23. The filter of claim 17 wherein: the sleeve means has a height and circumference less than the height and circumference of the basket of the coffee maker.

\* \* \* \* \*